United States Patent Office 3,193,056
Patented July 6, 1965

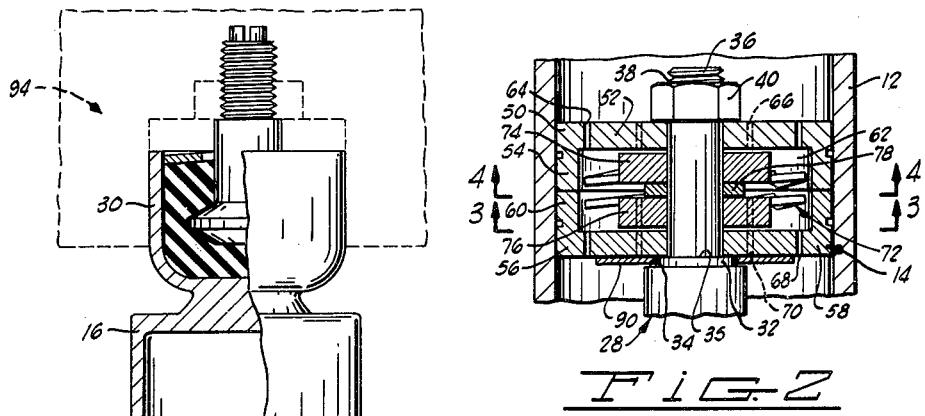

3,193,056
SHOCK ABSORBER
Robert A. Clay, 3117 Overton Park E., Fort Worth, Tex.
Filed Sept. 27, 1963, Ser. No. 312,116
5 Claims. (Cl. 188—96)

This invention relates generally to improved shock absorbers. More particularly, but not by way of limitation, this invention relates to improved apparatus useful in absorbing a portion of the shock transmitted between relatively moving members, such as between the wheels and frame of a motor vehicle.

In the past, shock absorbers have generally been of a rather complex construction involving many moving parts. Many have incorporated pistons slidingly mounted in a cylinder assembly. Such pistons usually have valve mechanisms utilizing springs of various shapes and sizes to control the opening and closing of the valves and, consequently, the rate of movement of the piston through the cylinder assembly. After an extended period of operation, the spring characteristics will change, resulting in either a complete failure of the shock absorber or in such a radical change in the operation of the shock absorber that it will no longer serve its intended purpose. Shock absorber failures due to spring problems are due in part to the temperatures generated during the continuous movement of the piston through the fluid in the cylinder. Another cause of high operating temperatures in shock absorbers is the close fit required between the piston and the cylinder in prior shock absorbers to prevent leakage of fluid therebetween.

To my knowledge, all shock absorbers now available require that the cylinder in which the piston operates be completely filled with hydraulic fluid. In order to do this, reservoirs are provided which are connected through a valve to the cylinder. Most of the reservoirs take the form of an outer cylinder surrounding the cylinder in which the piston operates. The use of the outer cylinder has presented several problems. First, the dissipation of heat generated in the inner cylinder is more difficult. Second, because of space limitations, the inner cylinder is necessarily smaller in diameter. Such reduction in diameter results in higher operating pressure for a given force acting on the shock absorber. Third, the additional valve required increases the complexity of the shock absorber, enhancing the chance of failure.

Many shock absorbers also have the piston positioned on the piston operating rod by means of springs so that initial movement of the rod in either direction is absorbed by the springs rather than by the fluid. An arrangement of this type results in free play and loss of control in the shock absorber. While free play of this magnitude may seem to be unimportant, it must be considered in view of the fact that most of the movements occurring in shock absorbers are of a magnitude of one inch or less. The possible result of the free movement of the rod relative to the piston could be the transmission of a shock through the absorber upon reaching the end of the free movement and encountering the relatively solid hydraulic fluid mass.

An object of the present invention is to provide an improved shock absorber that includes relatively few moving parts and that can be easily and economically manufactured.

Another object of the invention is to provide an improved shock absorber that can be quickly and easily repaired.

Still another object of the invention is to provide an improved shock absorber incorporating a piston moving through fluid in a cylinder wherein the fluid does not completely fill the cylinder.

A further object of the invention is to provide an improved shock absorber that generates less heat and that quickly dissipates the heat that is generated during operation of the shock absorber.

A still further object of the invention is to provide an improved shock absorber wherein the fluid and piston continuously cooperate to maintain optimum shock absorbing efficiency at all times.

The foregoing objects of the invention are attained by the improved shock absorber which includes an elongated cylinder containing a fluid and having a hollow piston slidingly positioned therein. Sufficient clearance exists between the piston and cylinder so that the relationship therebetween may be characterized as a loose fit. A rod is connected with the piston and extends through one end of the cylinder. A rotor member is located within the hollow piston and is rotatable on the rod. The piston has at least one passageway extending therethrough so arranged that movement of the piston in the cylinder causes fluid to pass through the passageway, resulting in the rotation of the rotor member. Rotation of the rotor member creates a turbulence further restricting fluid flow through the piston.

Other further and additional objects and advantages of the invention will become more apparent as the following description is read in conjunction with the accompanying drawings wherein like reference characters denote like parts in all views and wherein:

FIG. 1 is a view, partly in elevation and partly in cross-section, of a shock absorber constructed in accordance with the invention;

FIG. 2 is an enlarged cross-sectional view of the detailed construction of a piston, a portion of a rod, and a portion of a cylinder, all constructed in accordance with the invention;

FIG. 3 is a cross-sectional view taken along the line 3—3 of FIG. 2, illustrating the construction of one of the rotor members; and FIG. 4 is a cross-sectional view taken along the line 4—4 of FIG. 2, illustrating the construction of the other rotor member.

Referring to the drawings, and to FIG. 1 in particularly, illustrated therein is a shock absorber generally designated by the reference numeral 10. The shock absorber 10 includes a cylinder 12 having a piston assembly 14 slidingly located therein. The cylinder 12 has a closed end 16 and an open end 18. The exterior of either end of the cylinder 12 may be provided with a plurality of heat dissipating, radially extending fins such as are shown at 19 on a cap 24. A suitable mounting bracket 20 is fixed to the closed end 16. The open end 18 of the cylinder 12 may be threaded, as at 22, for receiving the cap 24.

The cap 24, as illustrated, is provided with threads 26 which are adapted to mate with the threads 22 on the cylinder 12. It should be understood that the cap 24 can be attached to the cylinder 12 by welding, cementing, or any suitable method. Cap 24 is provided with an opening 27 which is adapted to receive an elongated rod 28.

The rod 28 is provided at one end with a suitable mounting bracket 30. The other end 32 of the rod (see FIG. 2) is reduced in diameter forming an abutment 34 and then reduced again forming a shoulder 35 and the end portion 36. As illustrated, end portion 36 is provided with threads 38. A nut 40 is screwed on the threads 38 securing the piston assembly 14 to the rod 28. Naturally, any conventional method may be used to secure the piston assembly 14 to the rod 28 instead of the nut 40 as shown.

A circular plate 42 (see FIG. 1), having a step 44 formed in its periphery, slidingly encircles the rod 28 at the end 18 of the cylinder 12. The step 44 is adapted to engage the open end 18 of cylinder 12 and to be located within the cap 24. A resilient sealing member 46 encircles the rod 28 between the circular plate 42 and the cap 24 and is of sufficient thickness that the sealing member 46 will be compressed therebetween and deformed into sealing engagement with the rod 28. As shown in FIG. 1, an annular depression 48 is provided in the circular plate 42 immediately surrounding the rod 28. The annular depression 48 enhances the seal obtained when the sealing member 46 is compressed, but is not an essential feature of the invention.

The piston assembly 14 includes a top member 50 encircling the end portion 36 of the rod 28. The top member 50 has a circular top plate portion 52 and a downwardly extending circumferential flange portion 54. The piston assembly 14 also includes a bottom member 56 encircling the end portion 36 of the rod 28. The bottom member 56 has a circular bottom plate portion 58 and an upwardly extending circumferential flange portion 60. When assembled on the rod 28, the top member 50 and bottom member 56 define a chamber 62 within the piston assembly 14. The piston assembly 14 is retained on the end portion 36 of the rod 28 between the nut 40 and the shoulder 35.

As shown in FIG. 2, passageways 64 and 66 extend through the top plate portion 52 of the top member 50. The passageways 64 are arranged so that they extend through the top plate portion 52 just inside the circumferential flange portion 54. The passageways 66 are arranged so that they extend through the top plate portion 52 between the rod 28 and the passageways 64. Passageways 68 and 70 extend through the bottom plate portion 58 of the bottom member 56. The passageways 68 and 70 are arranged in a manner similar to the arrangement of the corresponding passageways 64 and 66 in the top member 50. The number and size of the passageways will be varied depending on the desired operating characteristics of the shock absorber.

Rotatably mounted on the end portion 36 of the rod 28 and within the chamber 62 is a rotor assembly 72. The rotor assembly 72 includes upper and lower rotor members 74 and 76, respectively, which are separated by a spacer member 78. The length of the rotor assembly 72 is slightly less than the length of the chamber 62 for reasons that will be described hereinafter.

The upper rotor member 74 has a disc-like central portion 80 and a plurality of peripheral blade portions 82. The blade portions 82 are canted slightly so that fluid contacting the blade portions 82 will impart a rotation to the upper rotor member 74. The central portion 80 is of sufficient diameter to cover a portion of the passageways 66 which extend through the top member 50. FIG. 4 is a plan view illustrating the upper rotor member 74.

The lower rotor member 76 includes a disc-like central portion 84 and a plurality of peripheral blade portions 86. The blade portions 86 are canted slightly so that fluid contacting the blade portions 86 will impart a rotation to the lower rotor member 76. In the preferred form of the invention, the blade portions 86 are canted at an opposite angle to the blade portions 82 whereby fluid contacting the blade portions 82 and 86 will cause them to rotate in opposite directions. The central portion 84 has passageways 88 extending therethrough. The passageways 88 are arranged to be coincident with the passageways 70 in the bottom member 56. A continuous passageway is formed, extending from the chamber 62 through the lower rotor member 76 and the bottom member 56, when the passageways 70 and 88 are aligned or are coincident.

A disc-like valve member 90 encircles the rod 28 below the bottom member 56 of the piston assembly 14, but above the abutment 34 on the end 32 of the rod 28. In the preferred construction, the valve member 90 is movable longitudinally along the rod 28 between the abutment 34 and the bottom plate portion 54 of the bottom member 56. If desired, the valve member 90 can be constructed from a spring material and be restrained from moving longitudinally. In either form, the valve member 90 is sufficiently large in diameter to cover the passageways 70 in the bottom member 56. The purpose of the valve member 90 will be described in greater detail hereinafter.

*Operation*

The operation of the shock absorber 10 may best be described in connection with its use in motor vehicles. The shock absorber 10 is located between the wheels 92 and body 94 of a vehicle. The mounting bracket 20, which is connected to the free end of the rod 28, is attached to the wheels 92 of the vehicle. The mounting bracket 30, which is connected to the closed end 16 of the cylinder 12, is attached to the body 94 of the vehicle. As is well known to those skilled in the vehicle art, the primary load carrying members between the wheels 92 and body 94 are generally springs. Shock absorbers operate in conjunction with the springs to reduce the shock transmitted to the body 94 when the wheels 92 encounter an abrupt bump or depression in the roadway. The shock absorbers also aid in reducing the oscillation of the vehicle body 94 due to the inherent characteristics of the springs.

When the wheel 92 of a vehicle strikes a bump in the roadway, the wheel 92 is driven upwardly very suddenly. Without shock absorbers, the spring supporting the wheel 92 would be compressed to its closed height or until the axle of the wheel 92 strikes a stop member on the body 94. When this occurs, the impact is transmitted directly to the body 94, resulting in a very uncomfortable ride for the occupants.

With the shock absorber 10 installed on the vehicle, as previously described, the wheel 92 is restrained from such an extreme movement because the piston assembly 14 which is mounted on the rod 28 must be moved through the fluid in the cylinder 12. As the rod 28 and piston assembly 14 move upwardly, the rotor members 74 and 76 move downwardly in the chamber 62 uncovering the passageways 66 in the top member 50 of the piston assembly 14. Simultaneously, the valve member 90 moves downwardly uncovering the passageways 70.

Movement of the fluid into the chamber 62 of the piston assembly 14 is accomplished through the passageways 64 and 66 in the top member 50. As the fluid moves through the chamber 62, it contacts the blade portions 82 and 86 of the rotor members 74 and 76, respectively, imparting a counter-rotation to the rotor members 74 and 76. Due to the rotation of the rotor members 74 and 76, turbulence is created in the chamber 62 further restricting fluid flow therethrough. Egress of the fluid from the chamber 62 is accomplished through the passageways 68 and through the passageways 70 and 88 when they are aligned.

Contrary to the usual construction of shock absorbers, the piston assembly 14 does not form a fluid-tight seal with the cylinder 12. The shock absorber 10 has been successfully operated with as much as .006–.010 of an inch difference between the diameter of the piston assembly 14 and the cylinder 12. Since no seal is formed, fluid can pass between the piston assembly 14 and the cylinder 12, thereby materially reducing the heat that is generated by friction in the usual shock absorber.

One advantage presented by the shock absorber 10 is that the cylinder 12 does not have to be completely filled with fluid as is required in commercially available shock absorbers. As previously pointed out, this feature eliminates the external fluid reservoir and valving between the reservoir and operating cylinder required in prior shock absorbers.

It is believed that the cylinder 12 need not be completely filled with fluid because the movement of the piston assembly 14 and rod 28 through the cylinder 12 is restrained by a partial vacuum created below the piston assembly 14 as it moves upwardly through the fluid in the cylinder 12. The magnitude of the partial vacuum can be controlled by varying the angle of the blade portions 82 and 86 of the rotor members 74 and 76, respectively, for a fixed clearance between the piston assembly 14 and the cylinder 12.

The partial vacuum created can also be varied by changing the number or size of the passageways extending through the piston assembly 14. Variation in the clearance between the piston assembly 14 and the cylinder 12 can also be compensated for by changing the angle of the blade portions 82 and 86 or by changing the size and number of the passageways extending through the piston assembly 14.

The foregoing theory is further strengthened by a simple experiment conducted with the shock absorber 10. In the experiment, the shock absorber 10 was inverted and the cap 24 removed. The piston assembly 14 was then moved through the cylinder 12 which was partially filled with fluid and the same resistance to movement was observed, as with the cap 24 in place, even though the upper end 18 of the cylinder 12 was open. Upon moving the piston assembly 14 will not ever create a positive pressure, no fluid was forced upwardly; instead, the upper level of the fluid did not change except to drop slightly in proportion to the volume of the rod 28 withdrawn from the fluid.

The foregoing experiment would seem to prove that no pressure above atmospheric was present on the side of the piston assembly 14 in the direction of movement. This is not to say that extremely rapid movement of the piston assembly 14 will not ever create a positive pressure, but if such positive pressure is created, it appears that it would be relatively low as compared to the usual positive pressure created in shock absorbers. In any event, the invention disclosed herein should not be limited by the foregoing theoretical explanation of the operational phenomenon.

When the wheel 92 of the vehicle drops into a depression in the roadway or passes over a bump, the piston assembly 14 and rod 28 will be moved downwardly away from the closed end 16 of the cylinder 12. Movement of the piston assembly 14 downwardly will be somewhat slower than the upward movement because the valve member 90 moves upwardly closing the passageways 70 in the bottom member 56 of the piston assembly 14. Simultaneously, the rotor assembly 72 moves upwardly within the chamber 62 so that the central portion 80 of the upper rotor member 74 closes the passageways 66 in the top member 50 of the piston assembly 14. Fluid flow through the piston assembly 14 is limited to the passageways 68 into the chamber 62 and the passageways 64 out of the chamber 62. Such restricted flow results in the counter-rotation of the rotor members 74 and 76, but in opposite directions to the counter-rotation occurring during upward movement of the piston assembly 14. It is believed that the rate of downward movement of the piston assembly is a result of an increase in the magnitude of the partial vacuum created above the piston assembly 14. The increase in magnitude of the partial vacuum is attributed to the reduction in flow through the piston assembly 14, while the clearance between the piston assembly 14 and cylinder 12, and the angle of the blade portions 82 and 86 of the rotor members 74 and 76, remains constant.

One feature of the invention not readily apparent is the ease with which it can be repaired should a malfunction occur. After disconnecting one of the mounting brackets 20 or 30 from the vehicle, the cap 24 can be unscrewed from the cylinder 12 and the rod 28 and piston assembly 14 removed from the cylinder 12. All of the interior parts are then readily accessible for replacement or repair. As can be readily appreciated from an examination of the drawing, the shock absorber 10 contains only seven moving parts.

It is believed apparent from the foregoing description that the invention disclosed therein provides an improved shock absorber incorporating many novel features not heretofore available.

The single embodiment described in detail should be considered only as an example of apparatus constructed in accordance with the invention. It should be apparent that many changes and modifications can be made therein without departing from the spirit of the invention or from the scope of the annexed claims.

What I claim is:

1. A shock absorber comprising:
   an elongated cylinder having an open end and a closed end;
   a body of fluid in the cylinder;
   an elongated rod extending through the open end of said cylinder;
   means closing the open end of said cylinder encircling said rod, including means forming a fluid-tight seal with said rod;
   hollow piston means secured on said rod and movably positioned in said cylinder;
   rotor means rotatably located on said rod within said piston means, said rotor means including
      an upper rotor member having a disc-like central portion and a plurality of peripheral blade portions canted at an angle relative to said disc-like central portion, and
      a lower rotor member vertically spaced apart from said upper rotor member and having a disc-like central portion and a plurality of peripheral blade portions canted at an angle relative to said disc-like central portion and oppositely to the blade portions of said upper rotor member; and
   means forming at least one passageway through said piston means whereby fluid within said cylinder is caused to contact the blade portions of said rotor means upon movement of said piston means relative to said cylinder causing said upper and lower rotor members to rotate in opposite directions.

2. The shock absorber of claim 1 wherein said piston means includes:
   a top member having a circular top plate portion and a downwardly extending circumferential flange portion;
   a bottom member having a circular bottom plate portion and an upwardly extending circumferential flange portion;
   said upwardly and downwardly extending flange portions cooperating to define a wall of said piston means;
   means forming a plurality of passageways in said bottom plate portion;
   means forming a plurality of passageways in said top plate portion; and
   a disc-like member movably located on said rod below said bottom plate portion adapted to move from a position covering a porton of said passageways in said bottom plate portion to a position wherein said passageways are open.

3. A shock absorber comprising:
   an elongated cylinder having an open end and a closed end;
   a body of fluid in the cylinder;
   an elongated rod extending through the open end of said cylinder and having upper and lower abutment means near the end thereof extending into said cylinder;
   a cap member adapted to be secured to said cylinder and encircling said rod;
   hollow piston means movably positioned in said cylinder and encircling said rod below said lower abutment means and including, a top member having a circular top plate portion and a downwardly extending circumferential flange portion, a bottom member having a circular bottom plate portion and upwardly extending circumferential flange portion, said upwardly and downwardly extending flange portions cooperating to define a wall of said piston means;

means forming a plurality of passageways in said bottom plate portion;

means forming a plurality of passageways in said top plate portion;

rotor means rotatably located on said rod within said hollow piston means and including, an upper and a lower rotor member, each having a disc-like central portion and a plurality of canted peripheral blade portions, said blade portions on said upper rotor member being canted oppositely to the blade portions on said lower rotor member whereby fluid flowing through said piston means causes said rotor members to rotate in opposite directions;

a disc-like valve member movably located on said rod above said lower abutment and below the bottom member of said piston means adapted to move from a position covering a portion of said passageways in said bottom member to a position wherein said passageways are open; and means attached to said rod above said top member of said piston means for retaining said piston means on said rod.

4. Shock absorbing apparatus having a rod member movable in an elongated cylinder containing a fluid, the invention comprising:

hollow piston means positioned on the rod member for movement therewith in the cylinder;

rotor means rotatably located on the rod member within said hollow piston means, said rotor means including an upper rotor member having a disc-like central portion and a plurality of peripheral blade portions canted at an angle relative to said disc-like central portion, and a lower rotor member vertically spaced from said upper rotor member and having a disc-like central portion and a plurality of peripheral blade portions canted at an angle relative to said central portion and oppositely to the blade portions of said upper rotor member; and means forming at least one passageway through said piston means whereby fluid within the cylinder is caused to contact said rotor means upon movement of said piston means relative to the cylinder.

5. Shock absorbing apparatus having a rod member movable in an elongated cylinder containing a fluid, the invention comprising:

hollow piston means positioned on the rod member for movement therewith in the cylinder;

rotor means rotatably located on the rod member within said hollow piston, said rotor means including an upper rotor member having a disc-like central portion and a plurality of peripheral blade portions canted at an angle relative to said disc-like central portion, and a lower rotor member vertically spaced from said upper rotor member and having a disc-like central portion and a plurality of peripheral blade portions canted at an angle relative to said central portion and oppositely to the blade portions of said upper rotor member;

means forming a plurality of passageways through said piston means whereby fluid is caused to contact the blade portions of said upper and lower rotor members on movement of said piston means relative to the cylinder causing said upper and lower rotor members to rotate in opposite directions; and valve means moveably mounted on the rod member adapted to move from a position closing a portion of said passageways to a position wherein said passageways are open.

References Cited by the Examiner

UNITED STATES PATENTS

| | | | |
|---|---|---|---|
| 1,982,021 | 11/54 | Renfrew | 138—42 |
| 3,004,783 | 10/61 | Webb | 188—100 |
| 3,057,004 | 10/62 | Sogoian | 188—96 X |

FOREIGN PATENTS

| | | |
|---|---|---|
| 493,568 | 4/54 | Italy. |
| 129,328 | 8/50 | Sweden. |

EUGENE G. BOTZ, *Primary Examiner.*

UNITED STATES PATENT OFFICE
CERTIFICATE OF CORRECTION

Patent No. 3,193,056                                               July 6, 1965

Robert A. Clay

It is hereby certified that error appears in the above numbered patent requiring correction and that the said Letters Patent should read as corrected below.

Column 2, lines 42 and 43, for "particularly" read -- particular --; column 5, line 23, beginning with "Upon moving the" strike out all to and including "the fluid." in line 28, same column 5, and insert instead -- Upon moving the piston assembly 14 upwardly, toward the open end 18, no fluid was forced upwardly; instead, the upper level of the fluid did not change except to drop slightly in proportion to the volume of the rod 28 withdrawn from the fluid. --.

Signed and sealed this 15th day of February 1966.

(SEAL)
Attest:

ERNEST W. SWIDER                                 EDWARD J. BRENNER
Attesting Officer                                         Commissioner of Patents